US011877136B2

(12) United States Patent
Zhou

(10) Patent No.: US 11,877,136 B2
(45) Date of Patent: Jan. 16, 2024

(54) MULTI-INPUT-DRIVING LOUDSPEAKER

(71) Applicant: SUZHOU RUSHENG ELECTRONICS CO., LTD., Jiangsu (CN)

(72) Inventor: Jianming Zhou, Suzhou (CN)

(73) Assignee: SUZHOU RUSHENG ELECTRONICS CO., LTD., Jiangsu (CN)

( * ) Notice: Subject to any disclaimer, the term of this patent is extended or adjusted under 35 U.S.C. 154(b) by 222 days.

(21) Appl. No.: 17/622,910

(22) PCT Filed: Oct. 23, 2019

(86) PCT No.: PCT/CN2019/112649
§ 371 (c)(1),
(2) Date: Dec. 27, 2021

(87) PCT Pub. No.: WO2021/000459
PCT Pub. Date: Jan. 7, 2021

(65) Prior Publication Data

US 2022/0248143 A1 Aug. 4, 2022

(30) Foreign Application Priority Data

Jul. 2, 2019 (CN) ........................ 201921012649.X

(51) Int. Cl.
*H04R 25/00* (2006.01)
*H04R 9/06* (2006.01)
*H04R 1/02* (2006.01)

(52) U.S. Cl.
CPC ............. *H04R 9/063* (2013.01); *H04R 1/025* (2013.01); *H04R 2201/401* (2013.01); *H04R 2209/024* (2013.01); *H04R 2400/11* (2013.01)

(58) Field of Classification Search
CPC .... H04R 1/025; H04R 1/24; H04R 2201/401; H04R 2209/024; H04R 2400/11;
(Continued)

(56) References Cited

U.S. PATENT DOCUMENTS 6,748,090 B1 6/2004 Bachmann et al.

FOREIGN PATENT DOCUMENTS

CN 1121678 A 5/1996
CN 201263213 Y 6/2009
(Continued)

OTHER PUBLICATIONS

International Search Report for PCT /CN2019/112649 dated Mar. 13, 2020.

*Primary Examiner* — Phylesha Dabney
(74) *Attorney, Agent, or Firm* — Schmeiser, Olsen & Watts, LLP

(57) ABSTRACT

Provided is a multi-input-driving loudspeaker, including a frame, a cone arranged on the frame, and a plurality of input driving mechanisms, wherein each of the input driving mechanism includes a voice coil and a magnetic circuit assembly for driving the voice coil to vibrate; the frame is provided with a plurality of magnetic circuit mounting holes, and at most one magnetic circuit assembly is arranged at each magnetic circuit mounting hole, the cone is provided with a plurality of voice coil mounting holes, and at most one voice coil is provided at each voice coil mounting hole; the loudspeaker further includes a damper, the damper is opened with a plurality of voice coil holes, and each of the voice coils pass trough a corresponding voice hole and is closely fitted with the damper.

16 Claims, 4 Drawing Sheets

(58) Field of Classification Search
CPC ........ H04R 7/127; H04R 9/043; H04R 9/046; H04R 9/063
USPC .......................................................... 381/182
See application file for complete search history.

(56) References Cited

FOREIGN PATENT DOCUMENTS

| | | | | | |
|---|---|---|---|---|---|
| CN | 201639768 | U | | 11/2010 | |
| CN | 202713598 | U | | 1/2013 | |
| CN | 204733375 | U | | 10/2015 | |
| CN | 107454530 | A | * | 12/2017 | ............... H04R 9/02 |
| WO | WO-2005101901 | A1 | * | 10/2005 | ............... H04R 7/20 |

* cited by examiner

MULTI-INPUT-DRIVING LOUDSPEAKER

CROSS-REFERENCE TO RELATED APPLICATIONS

This application claims priority to PCT Application No. PCT/CN2019/112649, having a filing date of Oct. 23, 2019, which is based on CN 201921012649.X, having a filing date of Jul. 2, 2019, the entire contents both of which are hereby incorporated by reference.

FIELD OF TECHNOLOGY

The following relates to the loudspeaker field, in particular to a multi-input driving loudspeaker.

BACKGROUND

Existing loudspeakers generally adopt a structure comprising a conical cone (made of paper, PP and other materials) combined with a damper, the middle of the conical cone and the damper is respectively provided with a central hole, the damper is arranged below the conical cone, a single signal input voice coil passes through the center holes of the damper and the conical cone, and the conical cone and the damper are glued on the voice coil respectively to form a loudspeaker vibration system. This kind of loudspeaker can only be used for single signal input and has limitations on the reproduction of the original sound.

Therefore, one of the current improvements is to adopt a structure comprising a conical cone combined with a damper with a central hole in the middle thereof respectively, the damper is arranged under the conical cone, and the voice coil is changed from the single signal input mode to a multiple signal input mode and passes through the center holes of the damper and the conical cone, wherein the voice coil is formed by stacking multiple sets of coils from the inside to the outside, and the conical cone and the damper are glued on the voice coil respectively to form a loudspeaker vibration system. This kind of loudspeaker can be used for multiple signal input. However, since this type of loudspeaker has multiple sets of coils wound on one voice coil, winding multiple sets of coils on one voice coil increases the weight of the voice coil, and when the voice coil drives the cone, the sensitivity of the loudspeaker will be lost.

SUMMARY

An aspect relates to a multi-input-driving loudspeaker, which reduces the distortion of a loudspeaker and also improves the sensitivity and the intelligibility of the loudspeaker.

To achieve the above purpose, the technical solution employed by the present disclosure is:

a multi-input-driving loudspeaker comprising a frame, and a cone arranged on the frame, wherein each input driving mechanism comprises a voice coil and a magnetic circuit assembly for driving the voice coil to vibrate;

the frame is provided with a plurality of magnetic circuit mounting holes, and at most one magnetic circuit assembly is arranged at each magnetic circuit mounting hole;

the cone is provided with a plurality of voice coil mounting holes, and at most one voice coil is provided at each voice coil mounting hole;

the loudspeaker further comprises a damper, the damper is opened with a plurality of voice coil holes, and each of the voice coils pass through a corresponding voice coil hole and is closely fitted with the damper.

In the present disclosure, "multi-input" refers to multiple audio signal inputs; "multi-input driving" refers to multiple audio signals input to multiple voice coils, and the multiple voice coils jointly drive the loudspeaker to produce sound.

In an embodiment, the loudspeaker comprises three or more input driving mechanisms, and the three or more input driving mechanisms are arranged at equal intervals along a circle.

In an embodiment, the cone has a cone bottom with a flat-sheet shape and circular as a whole, and a center of the circle coincides with a center of the cone bottom, three or more voice coil mounting holes are opened on the cone bottom, center lines of the voice coil mounting holes pass through the circle, each of the voice coil mounting holes is provided with one voice coil so that the voice coil is connected with the cone bottom; three or more voice coil holes are opened on the damper, and the three or more voice coil holes are arranged at equal intervals along the circle. The bottom of the cone employs a flat-sheet shape, reduces the overall height of the cone, facilitates the reduction of the overall height of the loudspeaker, and broadens the directivity.

In an embodiment, three or more magnetic circuit mounting holes are arranged on the frame, the magnetic circuit mounting holes are arranged at equal intervals along the circle, and each of the magnetic circuit mounting holes is provided with one magnetic circuit assembly.

In an embodiment, the cone further comprises a tapered edge portion extending obliquely upwards from an outer edge of the cone bottom, and the tapered edge portion is fixedly connected to the frame through a yoke ring.

In an embodiment, the frame is provided with a flange surrounding the plurality of magnetic circuit mounting holes, and the damper and the flange cooperate with each other so that the damper is clamped into the flange.

In an embodiment, the flange is a closed circular ring shape.

In an embodiment, the damper has a main body portion shaped as flat-plate, and the voice coils are opened on the main body portion.

In an embodiment, the main body portion comprises a fabric layer and a plastic sheet layer laminated on each other.

In an embodiment, the frame is opened with a vent hole, and the vent hole is arranged between the plurality of magnetic circuit mounting holes. It is conducive to the discharge of the gas generated when the voice coils vibrate up and down and the heat generated during work.

In an embodiment, each of the input driving mechanisms further comprises a dust cover, and each of the voice coil mounting holes is covered with one dust cover.

In an embodiment, each magnetic circuit assembly comprises a U-yoke having an inner cavity, a magnetic steel and a magnetic pole core arranged within the U-yoke, a magnetic gap is formed between the magnetic steel and the magnetic pole core and an inner wall of the U-yoke, the voice coil is inserted in the magnetic gap and capable of moving in an up-and-down direction, and an upper edge of the U-yoke is fixedly connected to the magnetic circuit mounting hole of the frame.

In an embodiment, the magnetic steel is neodymium magnetic steel or ferrite magnetic steel.

In an embodiment, the frame is provided with multiple pairs of audio signal input terminals, each pair of audio signal input terminals is electrically connected to leads of one voice coil.

In an embodiment, the frame is provided with a plurality of reinforcing ribs. It can increase the strength of the cone when it is working.

In an embodiment, the plurality of input driving mechanisms is arranged along a circle, a straight line, or an array.

In an embodiment, the loudspeaker comprises three or more input-driving mechanisms, the three or more input driving mechanisms are arranged at equal intervals along a circle, the cone has a cone bottom with a flat-sheet shape and circular as a whole, a center of the circle coincides with a center of the cone bottom, three or more voice coil mounting holes are opened on the cone bottom, center lines of the voice coil mounting holes pass through the circle, each of the voice coil mounting holes is provided with one voice coil so that the voice coil is connected with the cone bottom, the loudspeaker further comprises a damper, three or more voice coil holes are opened on the damper, and the three or more voice coil holes are arranged at equal intervals along the circle, and each of the voice coils is inserted in a corresponding voice coil hole and is closely fitted with the damper.

Due to the use of the above technical solutions, the present disclosure has the following advantages over the conventional art:

In the multi-input-driving loudspeaker of the present disclosure, the structure is ingenious and rational, and the original sound reproduction and distortion are better than that of traditional loudspeakers by receiving audio signal input via multiple voice coils; by the input-driving structure formed by a plurality of voice coils and a plurality of magnetic circuit assemblies, the sensitivity of the loudspeaker is increased, and the intelligibility of the loudspeaker is improved.

BRIEF DESCRIPTION

Some of the embodiments will be described in detail, with references to the following Figures, wherein like designations denote like members, wherein.

LIST OF REFERENCE SIGNS

Figure 1:
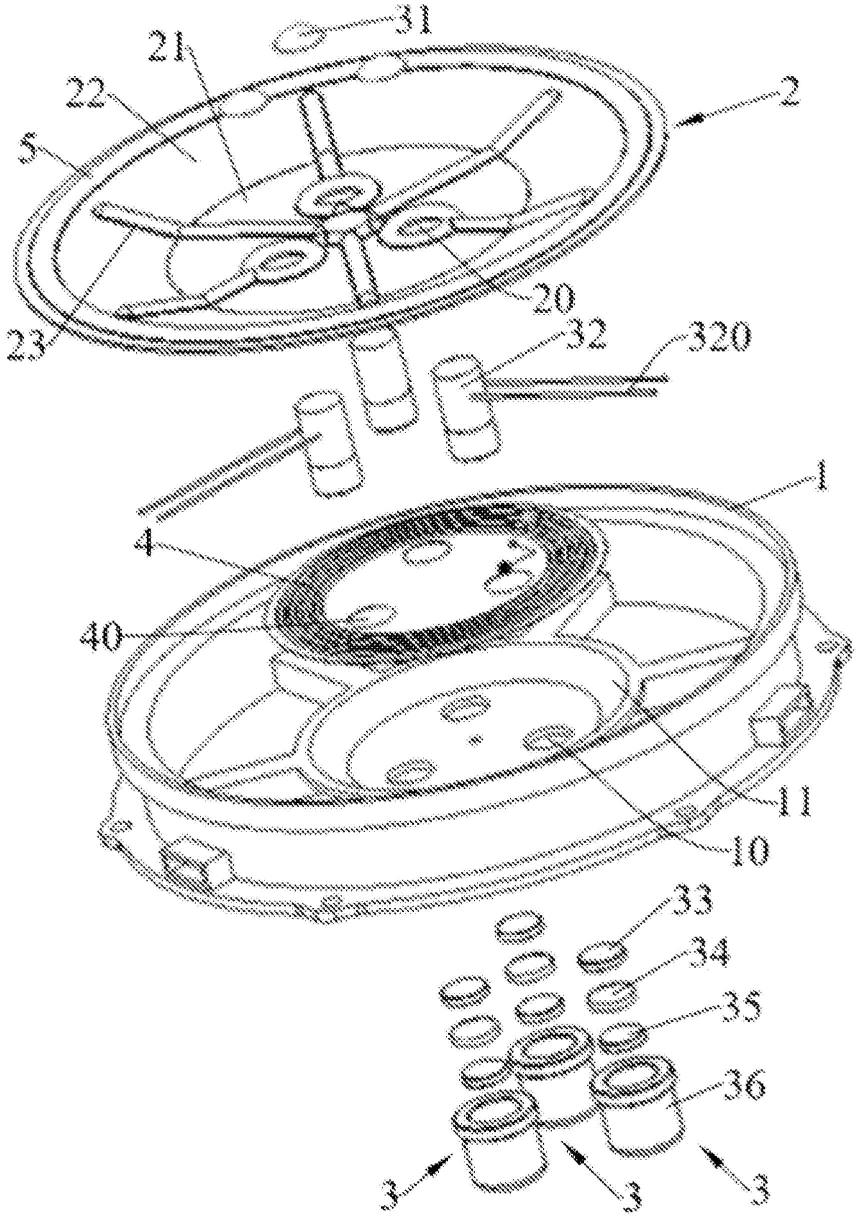
FIG. 1 is a schematic exploded view of a loudspeaker according to an embodiment of the present disclosure.

1—frame; 10—magnetic circuit mounting hole; 11—flange; 12—vent hole; 2—cone; 20—voice coil mounting hole; 21—cone bottom; 22—tapered edge portion; 23—reinforcing rib; 3—input drive mechanism; 31—dust cover; 32—voice coil; 320—lead; 33—secondary neodymium magnetic steel; 34—magnetic pole core; 35—main neodymium magnetic steel; 36—U-yoke; 4—damper; 40—voice coil hole; 5—yoke ring; 6—audio signal input terminal.

DETAILED DESCRIPTION

In the following, the preferable embodiment of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure.

This embodiment provides a multi-input-driving loudspeaker, herein, "multi-input" refers to multiple audio signal inputs, multiple audio signals are input to multiple voice coils, and the multiple voice coils jointly drive the loudspeaker to produce sound. Referring to FIG. 1 to FIG. 4, the multi-input-driving loudspeaker comprises a frame 1, a cone 2, a plurality of input driving mechanisms 3, and a damper 4. The cone 2 is used to vibrate to produce sound, and is fixed arranged on the frame 1. Each input driving mechanism 3 comprises a voice coil 32 and a magnetic circuit assembly for driving the voice coil 32 to vibrate; wherein, the frame 1 is provided with a plurality of magnetic circuit mounting holes 10, and at most one magnetic circuit assembly is arranged at each magnetic circuit mounting hole 10; the cone 2 is provided with a plurality of voice coil mounting holes 20, and at most one voice coil 32 is provided at each voice coil mounting hole the damper 4 is round as a whole, and is provided with a plurality of voice coil holes 40, and at most one voice coil 32 passes through each voice coil hole 40. That is, the plurality of input-driving mechanisms is mounted on the frame 1 and the cone 2. There are three or more input driving mechanisms 3 to increase the driving energy of the loudspeaker, and the three or more input driving mechanisms 3 are arranged at equal intervals along a circle. The cone has a cone bottom 21 with a flat-sheet shape and circular as a whole, and the center of the circle coincides with the center of the cone bottom 21, that is, the plurality of input driving mechanisms 3 is arranged at equal intervals along the circle of the cone bottom 21. Correspondingly, the cone bottom 21 is provided with three or more voice coil mounting holes 20, center lines of the voice coil mounting holes 20 pass through the circle, and each of the voice coil mounting holes 20 is provided with one voice coil 32 so that the voice coil 32 is connected with the cone bottom 21; the frame 1 is provided with three or more magnetic circuit mounting holes 10, the magnetic circuit mounting holes 10 are arranged at equal intervals along the circle, and each of the magnetic circuit mounting holes 10 is provided with one magnetic circuit assembly; the damper 4 is also provided with three or more voice coil holes 40, the voice coil holes 40 are arranged at equal intervals along the circle, center line of each voice coil hole 40 passes through the circle, each voice coil hole 40 is penetrated by one voice coil 32, and the diameter of the voice coil holes 40 matches the outer diameter of the voice coils 32, so that the voice coils 32 are tightly arranged in the damper 4. Specifically, as shown in FIGS. 1-4, the number of the input driving mechanisms 3, the voice coil mounting holes 20 and the magnetic circuit mounting holes 10 are all three, and they are evenly arranged in a ring around the center of the cone bottom 21.

In this embodiment, it is preferable to adopt a cone whose bottom is a circular shape as a whole, and the plurality of input-driving mechanisms are arranged in a ring around the circle of the bottom of the cone. In some other embodiment, the cone has an oval or rectangular cone bottom, and the plurality of the input-driving mechanisms are arranged linearly or in an array. In this embodiment, the frame 1 is made of plastic using processes such as injection molding, which is easy to form and has a certain strength, and the magnetic circuit mounting holes 10 are through holes that penetrate the frame 1 from top to bottom. The cone 2 further comprises a tapered edge portion 22 extending obliquely upwards from the outer edge of the cone bottom 21, and the tapered edge portion 22 is arranged in a circle around the cone bottom 21. The cone 2 is made of paper pulp, plastic (such as, PP (polypropylene)), ballistic fiber or aluminum alloy, and the made cone 2 is light in weight, has good damping elasticity and rigidity, high temperature and low temperature resistance, waterproof and mildew proof. In addition, the tapered edge portion 22 of the cone 2 is fixedly connected to the frame 1 through a yoke ring 5, which is made of sponge, rubber, or cloth. With the cone 2 with the above-mentioned shape, the directional expansion width is superior to that of the traditional conical loudspeaker, and the height is lower than that of the traditional conical cone 2, which is beneficial to reducing the overall height of the loudspeaker.

Figure 3:
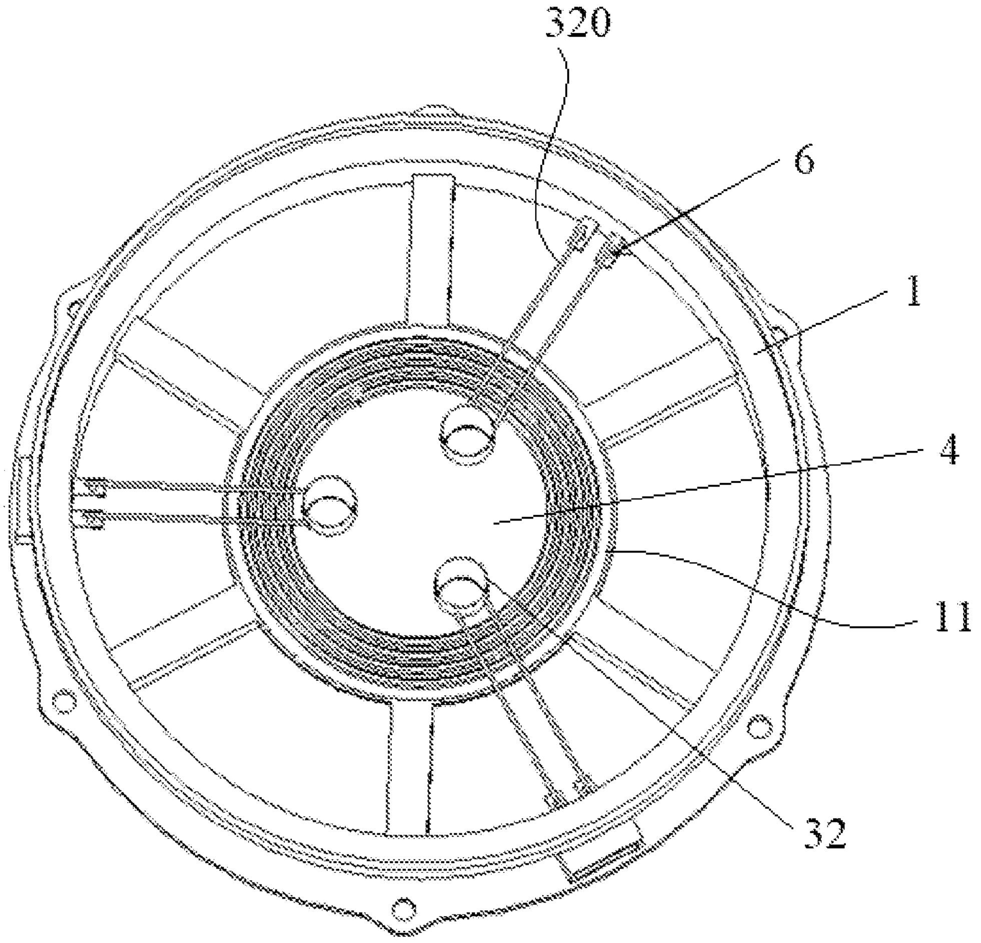
FIG. 3 is a schematic diagram of the frame in FIG. 1 after the voice coils and the damper are mounted.

The damper 4 is located in the cavity formed between the frame 1 and the cone 2 after they are connected, and is clamped into the frame 1, and with the restrict of the damper 4, the voice coils 32 can only move up and down, and cannot produce displacement in the horizontal direction. Specifically, the frame 1 has an upwardly extending flange 11 surrounding the three magnetic circuit mounting holes 10, the flange 11 is specifically a closed ring-shaped protrusion, and the damper 4 is clamped into the flange 11, and the outer edge of the damper 4 is in close contact with the inner wall of the flange, so that the damper 4 can be retained by the inner walls of the flange 11 (as shown in FIG. 3) to prevent the damper 4 from shaking. The main body portion of the damper 4 is flat, the edge of the damper 4 has annular recesses and protrusions, the voice coil holes 40 are opened on the main body portion of the damper 4, and the main body portion of the damper 4 comprises a fabric layer and a plastic sheet layer laminated on each other, the plastic sheet layer is fitted on the fabric layer, to increase the strength of the damper 4.

The frame 1 is opened with a vent hole 12 in the middle, and the vent hole 12 is arranged between the three magnetic circuit mounting holes 10, the vent hole 10 run through the middle of the frame 1 from top to bottom, which is conducive to the discharge of the gas generated when the voice coils vibrate up and down and the heat generated during work.

Each input-driving mechanism 3 also comprises a dust cover 31. The specific structure of the input-driving mechanisms 3 will be described in detail below. As shown in FIG. 1, each input-driving mechanism 3 constitutes of a dust cover 31, a voice coil 32, a secondary neodymium magnetic steel 33, a magnetic pole core 34, a main neodymium magnetic steel 35, and a U-yoke 36. In each of the input-driving mechanism 3, the dust cover 31 is fixedly connected to the cone 2, each voice coil mounting hole 20 is covered with one dust cover 31, and the voice coil 32 is covered under the dust cover 21. The upper end portion of the voice coil 32 is inserted into and close fit with the voice coil mounting hole 20 of the cone 2, and the voice coil 32 is connected to the cone 2 to drive the cone 2 to vibrate. The U-yoke 36 has an inner cavity and an open upper end, the upper edge of the U-yoke 36 is fixedly connected at the magnetic circuit mounting hole 10 (such as the hole wall of the magnetic circuit mounting hole 10, or the lower surface of the frame 1 adjacent to the magnetic circuit mounting hole 10), and the magnetic circuit mounting hole 10 is in communication with the inner cavity of the U-yoke 36; the secondary neodymium magnetic steel 33, the magnetic pole core 34, and the main neodymium magnetic steel 35 are stacked from top to bottom, and are fixedly arranged in the inner cavity of the U-yoke 36, forming a magnetic circuit assembly; the lower surface of the secondary neodymium magnetic steel 33 is closely attached to the upper surface of the magnetic pole core 34, and the lower surface of the magnetic pole core 34 is closely attached to the upper surface of the main neodymium magnetic steel 35; there are a gap between the secondary neodymium magnetic steel 33, the magnetic pole the core 34 and the main neodymium magnetic steel 35 and the inner wall of the U-yoke 36, thereby forming a magnetic gap surrounding the secondary neodymium magnetic steel 33, the magnetic pole core 34 and the main neodymium magnetic steel 35, the lower end of the voice coil 32 is inserted into the magnetic gap downward from the magnetic circuit mounting hole 10, there is a gap between the voice coil 32 and the secondary neodymium magnetic steel 33, the magnetic pole core 34 and the main neodymium magnet 35, and there is also a gap between it and the inner wall of the U-yoke 36, so that it can move up and down in the magnetic gap.

The magnetic circuit assemblies in this embodiment adopt the aforementioned secondary neodymium magnetic steel and the main neodymium magnetic steel, which has the advantages of small volume and light weight. In some other embodiment, the aforementioned secondary neodymium magnetic steel and the main neodymium magnetic steel in the magnetic circuit assemblies can be replaced with ferrite magnetic steel respectively, thereby reducing the cost of the magnetic circuit assemblies.

Figure 2:
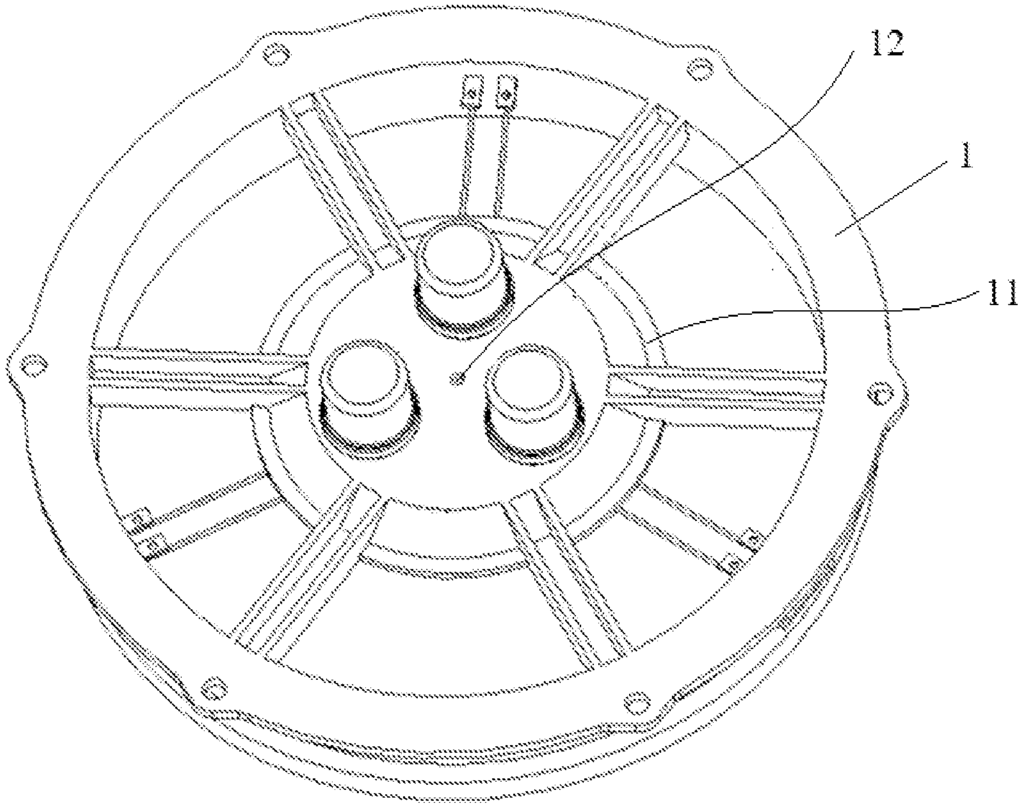
FIG. 2 is a schematic diagram of the frame in FIG. 1 after the magnetic circuit assemblies are mounted.

As shown in FIG. 2 and FIG. 3, the frame 1 is provided with three pairs of audio signal input terminals 6 at the edge portion, the three pairs of audio signal input terminals 6 are arranged at equal intervals along the circle, the frame 1 is provided with slots for connecting external cables, and each pair of audio signal input terminals 6 is electrically connected to a lead of one voice coil 32. Wherein, each pair of audio signal input terminals 6 comprises a positive terminal and a negative terminal, one lead of each voice coil 32 is electrically connected to the positive terminal of one pair of audio signal input terminals 6, and another lead is electrically connected to the negative terminal of this pair of audio signal input terminals 6, to receive the audio signal (analog signal or digital signal) input from the pair of audio signal input terminal 6. Thus, three voice coils 32 are simultaneously driven through the three pairs of audio signal input terminals 6. By providing multiple integrated terminals for audio signal input in the frame 1, the positive and negative leads of each voice coil 32 can be connected to the intermediate terminals at the bottom of the frame 1, and this connection method simplifies the manufacture of multi-input-driving loudspeakers, and is also convenient for the connection of audio signal input.

Figure 4:
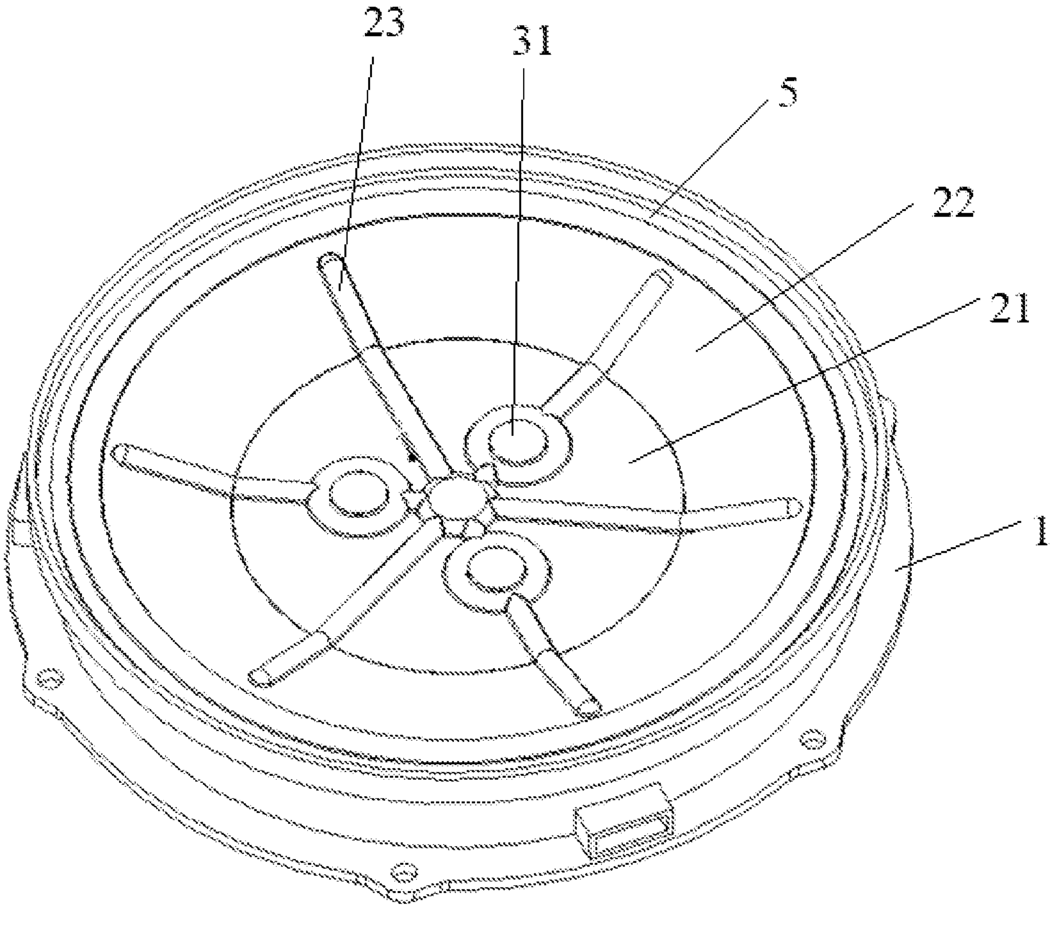
FIG. 4 is a schematic diagram of the loudspeaker after assembled in FIG. 1.

As shown in FIG. 4, a plurality of reinforcing ribs 23 are provided on the cone 2, which can increase the working strength of the cone 2. Specifically, as shown in FIG. 4, a plurality of reinforcing ribs 23 are arranged at equal intervals along the circumferential direction of the cone 2, and each reinforcing rib 23 extends along the radial direction of the cone 2. The reinforcing ribs 23 are located between the voice coil mounting holes 20. In addition, the reinforcing ribs 23 extend from the cone bottom 21 to the tapered edge portion 22, thereby enhancing the strength between the flat cone bottom 21 and the tapered edge portion 22.

The working principle of the multi-input-driving loudspeaker is: the audio signal is input to the plurality of voice coils 32 through the audio signal input terminals 5 on the frame 1, and the plurality of voice coils 32 move up and down synchronously under the action of the magnetic circuit assemblies, thereby driving the cone 2 to vibrate to produce sound. The multi-input-driving loudspeaker of the present disclosure adopts a cone 2 with a flat-shaped bottom, three or more voice coil mounting holes 20 are provided on the plane formed by the cone bottom 21, and tightly fitted with three or more voice coils 32, and then the voice coils 32 are tightly fitted with the damper 4 to form three or more input-driving mechanisms 3, and by using three or more magnetic circuit assemblies to drive the voice coils 32, and three or more voice coils 32 to drive the voice cone 2, it can not only reduce the height of the product, but also broaden the directivity of the product, and through multiple audio signal inputs, it can reduce the distortion of the product, increase the sensitivity of the loudspeakers, and improve the intelligibility of the loudspeaker. The use of integrated terminals simplifies the connection of the product and facilitates the connection of audio signal input.

The loudspeaker structure is ingenious and rational, and through the use of a flat-bottom conical cone structure, the flat-bottom conical cone has a better directivity than traditional loudspeakers; by receiving the audio signal input via three or more voice coils, the original sound reproduction and distortion are better than that of traditional loudspeakers; by adopting a cone shape with flat-bottom, the height of the cone is lower than that of the traditional conical cone, and the reduction of the height of the cone can also reduce the height of the product; by using an input-driving structure composed of three or more voice coils and three or more magnetic circuit assemblies, the sensitivity of the loudspeaker is increased; by closely connecting the flat-bottom conical cone with three or more voice coils, the three or more voice coils are driven through three or more audio signal inputs to move up and down in the U-yoke magnetic circuit to drive the cone to sound.

Although the present invention has been disclosed in the form of preferred embodiments and variations thereon, it will be understood that numerous additional modifications and variations could be made thereto without departing from the scope of the invention.

For the sake of clarity, it is to be understood that the use of ‘a’ or ‘an’ throughout this application does not exclude a plurality, and ‘comprising’ does not exclude other steps or elements.

We claim:

1. A multi-input-driving loudspeaker, comprising:
- a frame having a plurality of magnetic circuit mounting holes, and at most one magnetic circuit assembly is a arranged at each magnetic circuit mounting hole;
- a cone arranged on the frame, the cone having a plurality of voice coil mounting holes, and at most one voice coil is provided at each voice coil mounting hole;
- a plurality of input driving mechanisms, wherein each of the input driving mechanism comprises a voice coil and a magnetic circuit assembly for driving the voice coil to vibrate; and
- a damper, wherein the damper is opened with a plurality of voice coil holes, and each of the voice coils pass through a corresponding voice coil hole and is closely fitted with the damper.

2. The multi-input-driving loudspeaker according to claim 1, further comprising three or more input driving mechanisms, and the three or more input driving mechanisms are arranged at equal intervals along a circle.

3. The multi-input-driving loudspeaker according to claim 2, wherein the cone has a cone bottom with a flat-sheet shape and circular as a whole, and a center of the circle coincides with a center of the cone bottom, three or more voice coil mounting holes are opened on the cone bottom, center lines of the voice coil mounting holes pass through the circle, each of the voice coil mounting holes is provided with one voice coil so that the voice coil is connected with the cone bottom; three or more voice coil holes are opened on the damper, and the three or more voice coil holes are arranged at equal intervals along the circle.

4. The multi-input-driving loudspeaker according to claim 2, wherein three or more magnetic circuit mounting holes are arranged on the frame, the three or more magnetic circuit mounting holes are arranged at equal intervals along the circle, and each of the magnetic circuit mounting holes is provided with one magnetic circuit assembly.

5. The multi-input-driving loudspeaker according to claim 3, wherein the cone further comprises a tapered edge portion extending obliquely upwards from an outer edge of the cone bottom, and the tapered edge portion is fixedly connected to the frame through a yoke ring.

6. The multi-input-driving loudspeaker according to claim 1, wherein the frame is provided with a flange surrounding the plurality of magnetic circuit mounting holes, and the damper and the flange cooperate with each other so that the damper is clamped into the flange.

7. The multi-input-driving loudspeaker according to claim 1, wherein the damper has a main body portion shaped as a flat-plate, and the voice coils are opened on the main body portion.

8. The multi-input-driving loudspeaker according to claim 7, wherein the main body portion comprises a fabric layer and a plastic sheet layer laminated on each other.

9. The multi-input-driving loudspeaker according to claim 1, wherein a vent hole is opened on the frame, and the vent hole is arranged between the plurality of magnetic circuit mounting holes.

10. The multi-input-driving loudspeaker according to claim 1, wherein each of the input driving mechanisms further comprises a dust cover, and each of the voice coil mounting holes is covered with one dust cover.

11. The multi-input-driving loudspeaker according to claim 1, wherein the frame is provided with multiple pairs of audio signal input terminals, each pair of audio signal input terminals is electrically connected to leads of one voice coil.

12. The multi-input-driving loudspeaker according to claim 1, wherein each magnetic circuit assembly comprises a U-yoke having an inner cavity, a magnetic steel and a magnetic pole core arranged within the U-yoke, further wherein a magnetic gap is formed between the magnetic steel and the magnetic pole core and an inner wall of the U-yoke, the voice coil is inserted in the magnetic gap and capable of moving in an up-and-down direction, and an upper edge of the U-yoke is fixedly connected to the magnetic circuit mounting hole of the frame.

13. The multi-input-driving loudspeaker according to claim 1, wherein the frame is provided with a plurality of reinforcing ribs.

14. The multi-input-driving loudspeaker according to claim 1, wherein the plurality of input driving mechanisms are arranged along a circle, a straight line, or an array.

15. The multi-input-driving loudspeaker according to claim 1, further comprising:
- three or more input-driving mechanisms, the three or more input driving mechanisms are arranged at equal intervals along a circle, the cone has a cone bottom with a flat-sheet shape and circular as a whole, a center of the circle coincides with a center of the cone bottom, three or more voice coil mounting holes are opened on the cone bottom, center lines of the voice coil mounting holes pass through the circle, each of the voice coil mounting holes is provided with one voice coil so that the voice coil is connected with the cone bottom; and three or more voice coil holes opened on the damper, and the three or more voice coil holes arranged at equal intervals along the circle, and each of the voice coils is inserted in a corresponding voice coil hole and is closely fitted with the damper.

16. The multi-input-driving loudspeaker according to claim 3, wherein the cone bottom is a round flat sheet with three or more voice coil mounting holes.

* * * * *